(12) United States Patent
Iwaki et al.

(10) Patent No.: US 6,354,742 B1
(45) Date of Patent: Mar. 12, 2002

(54) HYDRAULIC DYNAMIC BEARING AND SPINDLE MOTOR

(75) Inventors: Tadao Iwaki; Shigeru Ohki; Naoki Kawawada; Atsushi Ohta; Koji Nitadori; Isamu Takehara; Hiromitsu Goto; Takafumi Suzuki, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/535,376

(22) Filed: Mar. 24, 2000

(30) Foreign Application Priority Data

Mar. 26, 1999 (JP) .......................................... 11-084288

(51) Int. Cl.[7] .............................................. F16C 32/06
(52) U.S. Cl. ...................................................... 384/107
(58) Field of Search ........................ 384/100, 107–124; 310/90

(56) References Cited

U.S. PATENT DOCUMENTS

| | | | |
|---|---|---|---|
| 3,497,273 A | * 2/1970 | Muijderman et al. ....... 384/113 |
| 4,557,610 A | * 12/1985 | Asada et al. ................. 384/107 |
| 5,658,080 A | * 8/1997 | Ichiyama ..................... 384/112 |
| 5,770,906 A | * 6/1998 | Hazelton et al. ........ 384/100 X |
| 5,791,785 A | * 8/1998 | Nose et al. .................. 384/119 |
| 5,822,846 A | * 10/1998 | Moritan et al. ......... 384/115 X |

* cited by examiner

Primary Examiner—Thomas R. Hannon
(74) Attorney, Agent, or Firm—Adams & Wilks (57) ABSTRACT

In order to alleviate mutual interference between axial dynamic pressure portions and a radial dynamic pressure portion in a ring-like hydraulic dynamic pressure bearing, in the case of a ring-like hydraulic dynamic pressure bearing 1 constituted by supporting a shaft portion 4 constituted by fixing a ring 3 to an end portion 2A of a shaft main body 2 by a bearing portion 5, ring-like spaces 8 and 9 for storing lubricant for generating dynamic pressure are provided along contiguous portions of the radial dynamic pressure bearing portion and the axial dynamic pressure bearing portions formed between the ring 3 and the bearing portion 5, and the ring-like spaces 8 and 9 are maintained at atmospheric pressure via paths formed at the bearing portion 5 to thereby prevent negative pressure from generating at boundary regions of the two dynamic pressure bearing portions.

8 Claims, 6 Drawing Sheets

HYDRAULIC DYNAMIC BEARING AND SPINDLE MOTOR

BACKGROUND OF THE INVENTION

The present invention relates to a ring-like hydraulic dynamic pressure bearing having axial dynamic pressure portions and radial dynamic pressure portions alternately contiguous to each other and a spindle motor using this bearing.

There is used a hydraulic dynamic pressure bearing having a shaft portion and a bearing portion for supporting the shaft portion, formed with dynamic pressure generating grooves at either of the opposed faces of the two portions above and forming a layer of a lubricant at high pressure in the very small clearance between the two portions through the rotation of the shaft portion, to thereby realize noncontact rotation of the shaft portion, as a bearing of a spindle motor of a hard disk device.

Figure 8:
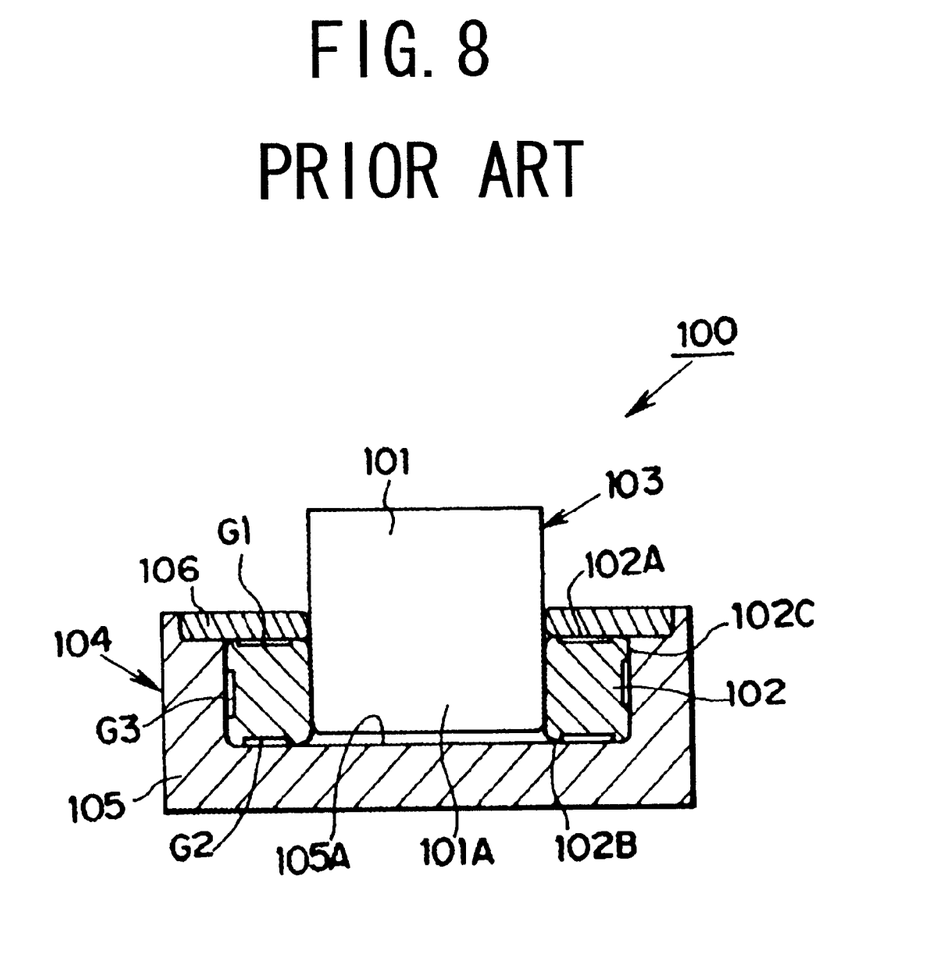
FIG. 8 is a sectional view of a conventional ring-like hydraulic dynamic pressure bearing.

FIG. 8 is a sectional view showing a conventional ring-like hydraulic dynamic pressure bearing. A ring-like hydraulic dynamic pressure bearing 100 is provided with a shaft portion 103 constituted by fixing a ring 102 to an end portion 101A of a shaft main body 101 by press fitting and a bearing portion 104 supporting the shaft portion 103 and constituted such that the ring 102 at the shaft portion 103 rotatably contained in a recessed portion 105A of a main body 105 of the bearing portion 104 is prevented from coming out from the recessed portion 105A by a circular disk thrust resisting member 106.

An upper face 102A and a lower face 102B of the ring 102 are provided with axial dynamic pressure generating grooves G1 and G2 respectively, and the outer peripheral face 102C of the ring 102 is provided with radial dynamic pressure generating grooves G3.

A lubricant for generating dynamic pressure is held between the shaft portion 103 and the bearing portion 104 and accordingly, when the shaft portion 103 is rotated, axial dynamic pressure is generated between the upper face 102A and the circular disk-like thrust holding member 106 by the axial dynamic pressure generating grooves G1 and axial dynamic pressure is generated between the lower face 102B and a bottom face of the recessed portion 105A by the axial dynamic pressure generating grooves G2. Further, radial dynamic pressure is generated between the peripheral face 102C and an inner peripheral face of the recessed portion 105A by the radial dynamic pressure generating grooves G3. As a result, axial dynamic pressure bearings and a radial dynamic pressure bearing which are lubricant layers at high pressure are formed between the shaft portion 103 and the bearing portion 104 to thereby enable rotation of the shaft portion 103 by noncontact rotation.

As described above, according to the conventional ring-like radial dynamic pressure bearing, there is constructed the constitution in which the radial dynamic pressure generating face and the axial dynamic pressure generating faces are contiguous to each other and accordingly, the following problem is posed: when the shaft portion 103 is rotated, because of the axial dynamic pressure generating grooves G1, the axial dynamic pressure generating grooves G2 and the radial dynamic pressure generating grooves G3 which are respectively formed at the upper face 102A, the lower face 102B and the peripheral face 102C of the ring 102, the lubricant is drawn to central portions of the respective dynamic pressure generating faces and negative pressure is produced at portions of the upper face 102A and the peripheral face 102C contiguous to each other and portions of the lower face 102B and the peripheral face 102C contiguous to each other. As a result of producing the negative pressure caused by mutual interference, air bubbles are liable to be generated at the portions of the dynamic pressure generating faces contiguous to each other and hamper flow of the lubricant and accordingly, an unfavorable condition may occur in which sufficient dynamic pressure is not generated and the bearing rigidity is deteriorated.

SUMMARY OF THE INVENTION

Hence, it is an object of the invention to provide a hydraulic dynamic pressure bearing capable of resolving the above-described problem in the conventional technology and a spindle motor using the above bearing.

In order to resolve the above-described problem, according to an aspect of the invention, there is proposed a hydraulic dynamic pressure bearing which is a ring-like hydraulic dynamic pressure bearing comprising a shaft portion constituted by fixing a ring to an end portion of a shaft main body thereof and a bearing portion supporting the shaft portion via the ring and formed with a radial dynamic pressure bearing portion and axial dynamic pressure bearing portions contiguous to each other between the ring and the bearing portion wherein ring-like spaces for storing a lubricant for generating dynamic pressure are provided along portions where the radial dynamic pressure bearing portion and the axial dynamic pressure bearing portions are contiguous to each other and the ring-like spaces are maintained at an atmospheric pressure.

When relative rotational motion is produced between the shaft portion and the bearing portion, lubricant in the respective dynamic pressure bearing portions is drawn to respective central portions of these to thereby generate required dynamic pressure. Therefore, at regions of the radial dynamic pressure bearing portion and the axial dynamic pressure bearing portions contiguous to each other, the lubricant is going to be reduced. Lubricant is stored at the ring-like spaces provided along contiguous portions of two dynamic pressure bearing portions, the inside of the ring-like spaces kept at atmospheric pressure, and accordingly the lubricant which is needed in the dynamic pressure bearing portions is smoothly supplied from the inside of the ring-like spaces. Therefore, mutual interference is not produced between the two dynamic pressure bearing portions. As a result, negative pressure is not generated at portions of the two dynamic pressure bearing portions contiguous to each other and no air bubbles are produced in the lubricant and accordingly, the bearing rigidity can be made higher than that of the conventional bearing.

The radial dynamic pressure bearing can be formed by providing dynamic pressure generating grooves at an outer peripheral face of the ring on an inner face of the bearing portion opposed thereto. The axial dynamic pressure bearing can be formed by providing dynamic pressure generating grooves at at least one of the plane portions contiguous to the outer peripheral face of the ring. Or, the dynamic pressure generating grooves may be formed at inner faces of the bearing portion opposed to the plane portions.

The spaces for storing the lubricant can be provided by forming ring-like recessed portions at boundary regions between the outer peripheral face of the ring and the planes contiguous thereto. The cross-sectional shape of the recessed portion may be that of a circular arc or an arbitrary stepped L-like shape.

In order to maintain the ring-like spaces for storing the lubricant at the atmospheric pressure, communicating means for communicating the spaces with the atmosphere can be formed at the bearing portion. Constricted passages are provided in the communicating means to thereby prevent the lubricant from leaking from the ring-like spaces to outside.

Further, according to another aspect of the invention, there is proposed a constitution in which a clearance is provided between an end face of the shaft main body and the bearing portion opposed thereto and paths at the inner peripheral face for communicating with the clearance with the atmosphere are formed to thereby enable circulation of a lubricant through the above clearance and the circulating paths.

According to the constitution, in the case in which there is constructed a constitution in which axial dynamic pressure is generated between the plane portion on an end face side of the shaft main body and the plane portion of the bearing, even when the lubricant disposed in the clearance is drawn to the ring side in generating the dynamic pressure, owing to the lubricant circulating to the clearance by passing through the paths communicating with the atmosphere, negative pressure can effectively be prevented from generating in the clearance. As a result, the dynamic pressure is satisfactorily generated at the plane portion and the bearing rigidity can further be promoted.

Further, in either case, the ring-like space for storing the lubricant is not limited to a constitution provided by machining the ring, but in place thereof or in addition thereto, there may be constructed a constitution provided by, for example, a ring-like groove at a corresponding portion of the bearing portion.

DETAILED DESCRIPTION OF THE PREFERRED EMBODIMENT

A detailed explanation will be given of an example of an embodiment according to the invention in reference to the drawings as follows.

Figure 1:
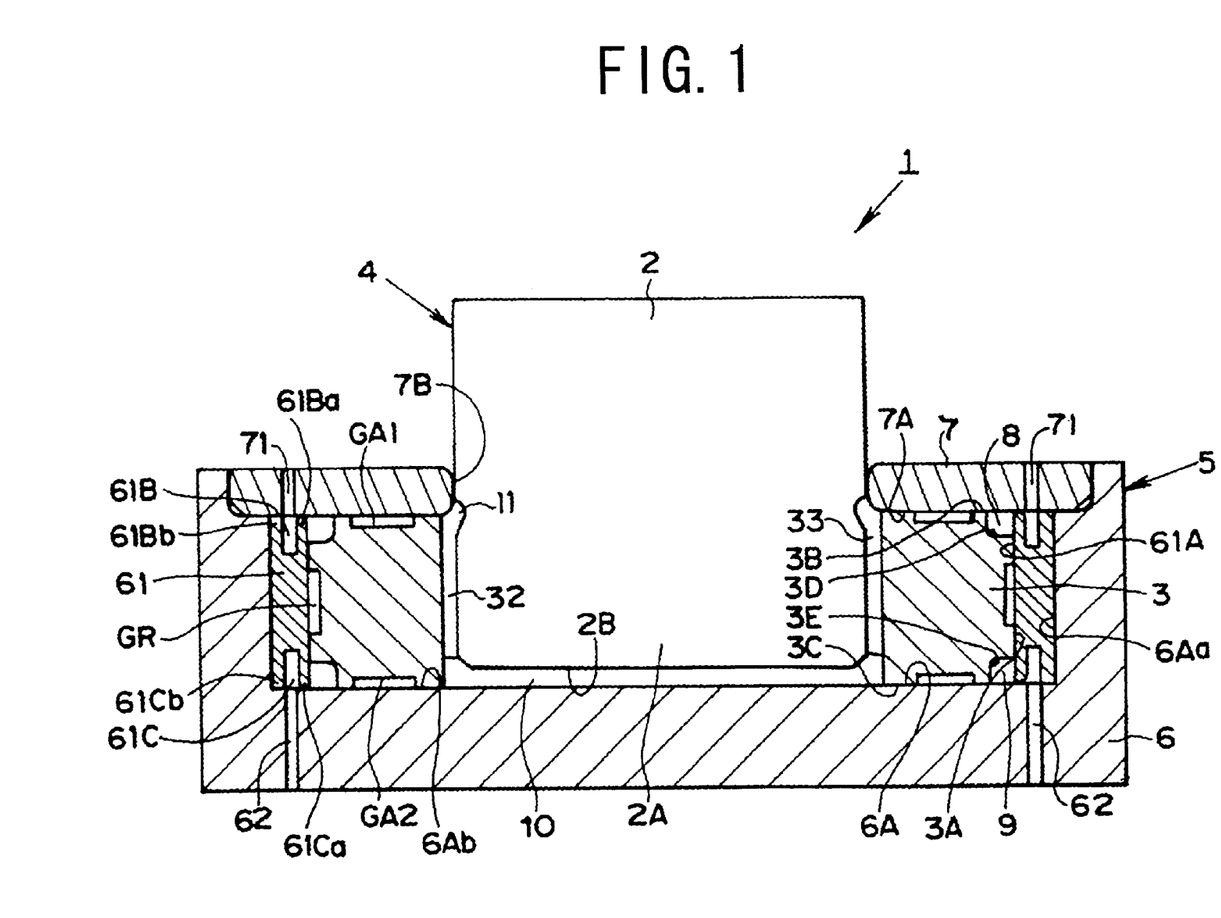
FIG. 1 is a sectional view showing an example of an embodiment of a ring-like hydraulic dynamic pressure bearing according to the invention.

FIG. 1 is a sectional view showing an example of an embodiment of a ring-like hydraulic dynamic pressure bearing according to the invention. A ring-like hydraulic dynamic pressure bearing 1 is provided with a shaft portion 4 constituted by fixing a ring 3 to an end portion 2A of a shaft main body 2 by press fitting and a bearing portion 5 supporting the shaft portion 4. The bearing portion 5 is provided with a bearing portion main body 6 and a thrust resisting member 7 in a circular disk shape.

An explanation will be given of the constitution of the bearing portion 5 in reference to FIG. 2. Inside of a recessed portion 6A of the bearing main body 6, a ring-like member 61 is fitted and fixed to the inner peripheral face 6Aa of the recessed portion 6A. There is constructed a constitution in which the ring 3 of the shaft portion 4 is rotatably contained in the recessed portion 6A of the bearing main body 6 attached to the ring-like member 61 as described above, and is held by the thrust holding member 7 to thereby prevent the ring 3 from coming out from the recessed portion 6A. Further, lubricant is held between the bearing portion 5 and the bearing portion main body 6.

Figure 3:
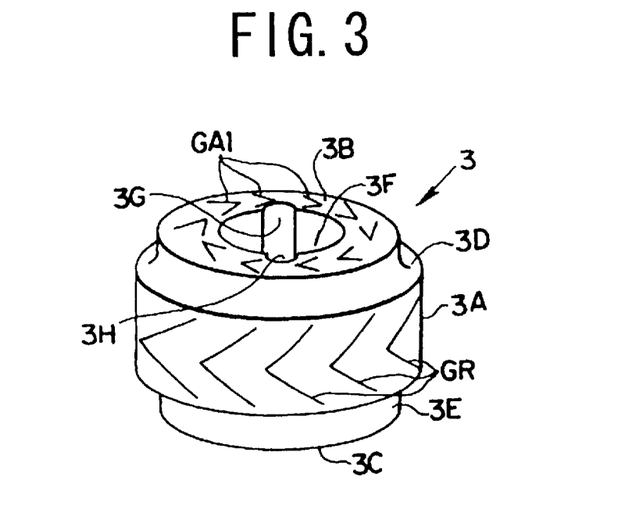
FIG. 3 is a perspective view enlarging the ring shown in FIG. 1.

FIG. 3 shows an enlarged view of the ring 3. An outer peripheral face 3A of the ring 3 is formed with radial dynamic pressure generating grooves GR and axial dynamic pressure grooves GA1 are formed at a plane portion 3B contiguous to the outer peripheral face 3A of the ring 3. Axial dynamic pressure generating grooves GA2 are similarly formed at a plane portion 3C on a side opposed to the plane portion 3B although not visible in FIG. 3 (refer to FIG. 1). Both the radial hydraulic pressure generating grooves GR and the axial dynamic pressure generating grooves GA1 and GA2 can be formed by a publicly-known method.

The ring 3 is formed as described above and accordingly, as shown by FIG. 1, when the ring 3 is rotated in the bearing portion 5 constituted by the bearing portion main body 6 and the thrust resisting member 7, a radial dynamic pressure portion is formed by the outer peripheral face 3A and an inner peripheral face 61A of the ring-like member 61 opposed thereto. Simultaneously therewith, an axial dynamic pressure portion is formed by the plane portion 3B and the bottom face 7A of the thrust holding member 7 opposed thereto and another axial dynamic pressure portion is formed by the plane portion 3C and a bottom face 6A*b* of the recessed portion 6A opposed thereto.

The radial dynamic pressure portion and the axial dynamic pressure portions formed between the shaft portion 4 and the bearing portion 5 as described above, are contiguous to each other and accordingly, the radial dynamic pressure portion and the axial dynamic pressure portions have a tendency to interfere with each other as has been explained already.

In order to eliminate the mutual interference, the ring 3 is provided with ring-like stepped portions 3D and 3E near the boundaries of the radial dynamic pressure portion and the axial dynamic pressure portions. The ring-like stepped portion 3D is a stepped portion having a cross-section in an L-like shape, and the outer peripheral face 3A and the plane portion 3D are separated by the ring-like stepped portion 3D. Further, when the shaft portion 4 and the bearing portion 5 are integrated, the ring-like stepped portion 3D forms a ring-like space 8 and the ring-like space 8 is used for storing the lubricant for generating dynamic pressure (refer to FIG. 1).

Meanwhile, the ring-like stepped portion 3E is similarly a stepped portion having a cross-section in an L-like shape, and the outer peripheral face 3A and the plane portion 3C are separated by the ring-like stepped portion 3E. Further, when the shaft portion 4 and the bearing portion 5 are integrated, the ring-like stepped portion 3E forms a ring-like space 9 and the ring-like space 9 is used for storing the lubricant for generating dynamic pressure (refer to FIG. 1).

Figure 2:
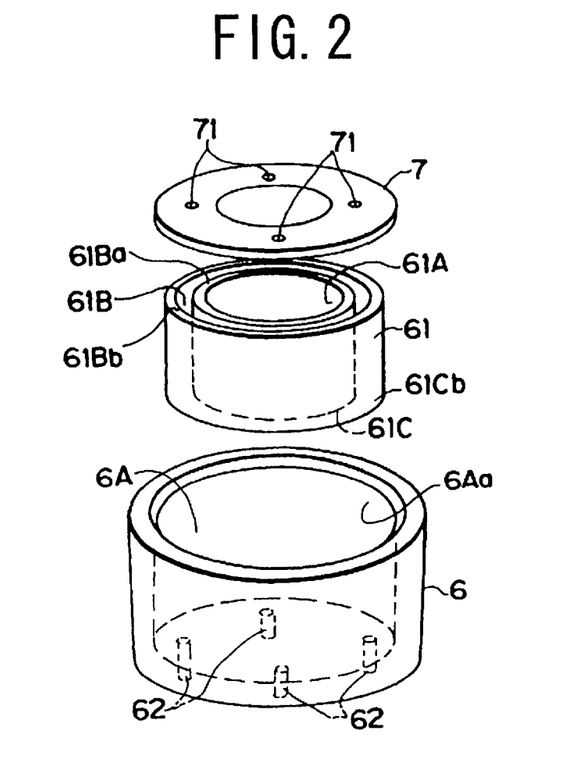
FIG. 2 is a disassembled perspective view of a bearing portion shown in FIG. 1.

As shown in detail in FIG. 2, a ring-like groove or recess 61B is formed at an end edge of the ring-like member 61. The height of an inner side ring-like wall 61Ba constituting the ring-like groove 61B is made lower than the height of an outer side ring-like wall 61Bb, thereby, in an assembled state of the ring-like hydraulic dynamic pressure bearing 1, the ring-like face 8 and the ring-like groove 61B are brought into communication with each other. Further, the ring-like groove 61B is communicated with a plurality of through holes 71 perforated at the thrust holding member 7 to thereby enable it to maintain the pressure of the lubricant stored in the ring-like space 8 at atmospheric pressure. an outer side ring-like wall 61Bb, thereby, in an assembled state of the ring-like hydraulic dynamic pressure bearing 1, the ring-like space 8 and the ring-like groove 61B are brought into communication with each other. Further, the ring-like groove 61B is communicated with a plurality of through holes 71 perforated at the thrust holding member 7 to thereby enable it to maintain pressure of the lubricant stored in the ring-like space 8 at atmospheric pressure.

In this case, the height of the inner side ring-like wall 61Ba is set such that a very small clearance serving as an oil seal is formed between the inner side ring-like wall 61Ba and the thrust holding member 7, thereby, there is constructed a constitution in which although the ring-like space 8 and the ring-like groove 61B communicate with each other, the lubricant inside of the ring-like space 8 is prevented from flowing into the ring-like groove 61B.

Similarly, a ring-like groove or recess 61C is formed also at the other edge of the ring-like member 61, and the height of the inner side ring-like wall 61Ca is lower than the height of an outer side ring-like wall 61Cb, thereby causing the ring-like space 9 and the ring-like groove 61B to communicate with each other in the assembled state of the ring-like hydraulic dynamic pressure bearing 1. Further, the ring-like groove 61C is made to communicate with the atmosphere by a plurality of through holes 62 perforated at the bearing portion main body 6, and thereby pressure of the lubricant stored inside of the ring-like space 9 can be maintained at atmospheric pressure.

In this case, the height of the inner side ring-like wall 61Ca is set such that a very small clearance serving as an oil seal is formed between the inner side ring-like wall 61Ca and the bottom face 6Ab, thereby, there is constructed a constitution in which although the ring-like space 9 and the ring-like groove 61C communicate with each other, the lubricant inside of the ring-like space 9 is prevented from flowing into the ring-like groove 61C.

As shown by FIG. 1, a very small space 10 is formed between a lower end face 2B of the shaft main body 2 and the bottom face 6Ab of the recessed portion 6 and the lubricant is filled also in the very small space 10. Meanwhile, a ring-like oil storage space 11 is provided at a vicinity of an upper end edge of an inner peripheral face 3F of the ring 3 and the oil storage space 11 communicates with the atmosphere via a clearance between the shaft main body 2 and an inner peripheral face 7B of the thrust holding member 7. Further, paths 32 and 33 for communicating between the very small space 10 and the oil storage space 11 are provided between the ring 3 and the shaft main body 2.

In reference to FIG. 3, in order to form the paths 32 and 33, vertical grooves 3G and 3H are formed at the inner peripheral face 3F of the ring 3 and when the shaft main body 2 is fitted to the ring 3, there is constructed a constitution in which the paths 32 and 33 are formed between the ring 3 and the shaft main body 2 by the vertical grooves 3G and 3H.

The ring-like hydraulic dynamic pressure bearing 1 is constituted as described above and accordingly, when the shaft portion 4 carries out rotational motion relative to the bearing portion 5, the lubricant held between the shaft portion 4 and the bearing portion 5 is pressurized at very small clearances between the shaft portion 4 and the bearing portion 5 by the radial dynamic pressure generating grooves GR and the axial dynamic pressure generating grooves G1 and G2, and thereby, the radial dynamic pressure portion and the axial dynamic pressure portions are formed contiguously to each other between the shaft portion 4 and the bearing portion 5.

As described above, the ring-like hydraulic dynamic pressure bearing 1 is formed with the ring-like space 8 maintained at the atmospheric pressure, the lubricant is filled there and accordingly, the lubricant drawn toward the center of the outer peripheral portion 3A of the ring 3 by the radial dynamic pressure generating grooves GR and the lubricant drawn toward the center of the plane portion 3B of the ring 3 by the axial dynamic pressure generating grooves GA1, are supplied from the lubricant inside the ring-like space 8 without producing negative pressure at the contiguous portions of the two dynamic pressure generating portions. Therefore, no mutual interference is produced between the radial dynamic pressure portion formed by the radial dynamic pressure generating grooves GR and the axial dynamic pressure portion formed by the axial dynamic pressure generating grooves GA1, no bubbles are produced in the lubricant and accordingly, excellent dynamic pressure property is achieved and high bearing rigidity is realized.

Similarly, owing to the lubricant filled in the ring-like space 9 being maintained at the atmospheric pressure, the lubricant drawn toward the center of the outer peripheral portion 3A of the ring 3 by the radial dynamic pressure generating grooves GR and the lubricant drawn toward the center of the plane portion 3C of the ring 3 by the axial dynamic pressure generating grooves GA2, are supplied by the lubricant inside the ring-like space 9 without producing negative pressure at contiguous portions of the two dynamic pressure generating portions. Therefore, no mutual interference is produced between the radial dynamic pressure portion formed by the radial dynamic pressure generating grooves GR and the axial dynamic pressure portion formed by the axial dynamic pressure generating grooves GA2, no air bubbles are produced in the lubricant and accordingly, excellent dynamic pressure property is achieved and high bearing rigidity is realized.

Further, in the ring-like hydraulic dynamic pressure bearing 1, by providing the pathr 32 and 33, when the lubricant in the very small space 10 is drawn between the plane portion 3C of the ring 3 and the bottom face 6Ab of the bearing portion main body 6 by the dynamic pressure portion produced by the axial dynamic pressure generating grooves GA2, the inside of the very small space 10 can be prevented from being brought under negative pressure. As a result, the dynamic pressure function of the axial dynamic pressure portion formed by the axial dynamic pressure generating grooves GA2 can be promoted and the axial rigidity of the ring-like hydraulic dynamic pressure bearing 1 also can further be promoted, Although an explanation has been given of the example of the embodiment of the ring-like hydraulic dynamic pressure bearing according to the invention as described above, the invention is not limited to the constitution of the embodiment.

Figure 4:
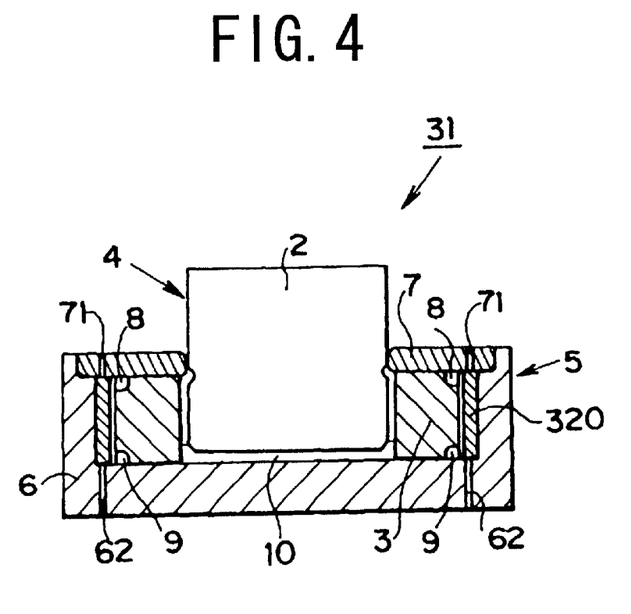
FIG. 4 is a sectional view showing another embodiment of a ring-like hydraulic dynamic pressure bearing portion according to the invention.
Figure 5:
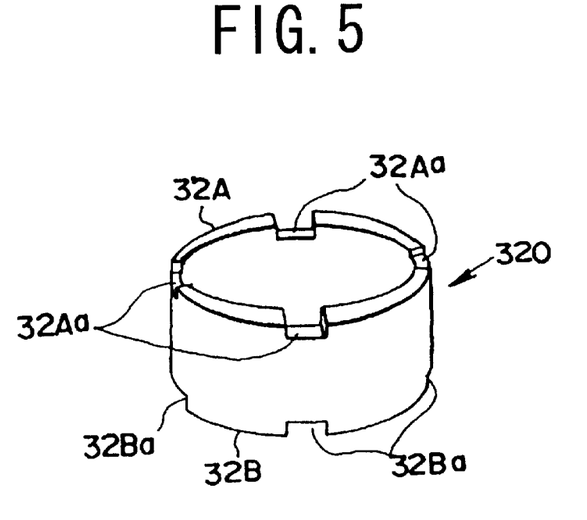
FIG. 5 is an enlarged perspective view of the ring-like member shown in FIG. 4.

FIG. 4 shows an embodiment of a ring-like hydraulic dynamic pressure bearing adopting a constitution separately from the constitution shown in FIG. 1 in order to maintain the ring-like spaces 8 and 9 under the atmospheric pressure. A ring-like hydraulic dynamic pressure bearing 31 shown in FIG. 4 differs from the ring-like hydraulic dynamic pressure bearing 1 in that, as shown by FIG. 5, in place of the ring-like member 61 there is used a ring-like member 320 provided with notches 32Aa and 32Ba at the upper end edge 32A and the lower end edge 32B respectively. According to the ring-like hydraulic dynamic pressure bearing 31, the ring-like space 8 is made to communicate with the through holes 71 via the notches 32Aa and the ring-like space 9 is made to communicate with the through holes 62 via the notches 32Ba.

The ring-like member 320 is provided with the shape simpler than that of the ring-like member 61 and machining thereof is simple and accordingly, a reduction in the cost can be expected.

Figure 6:
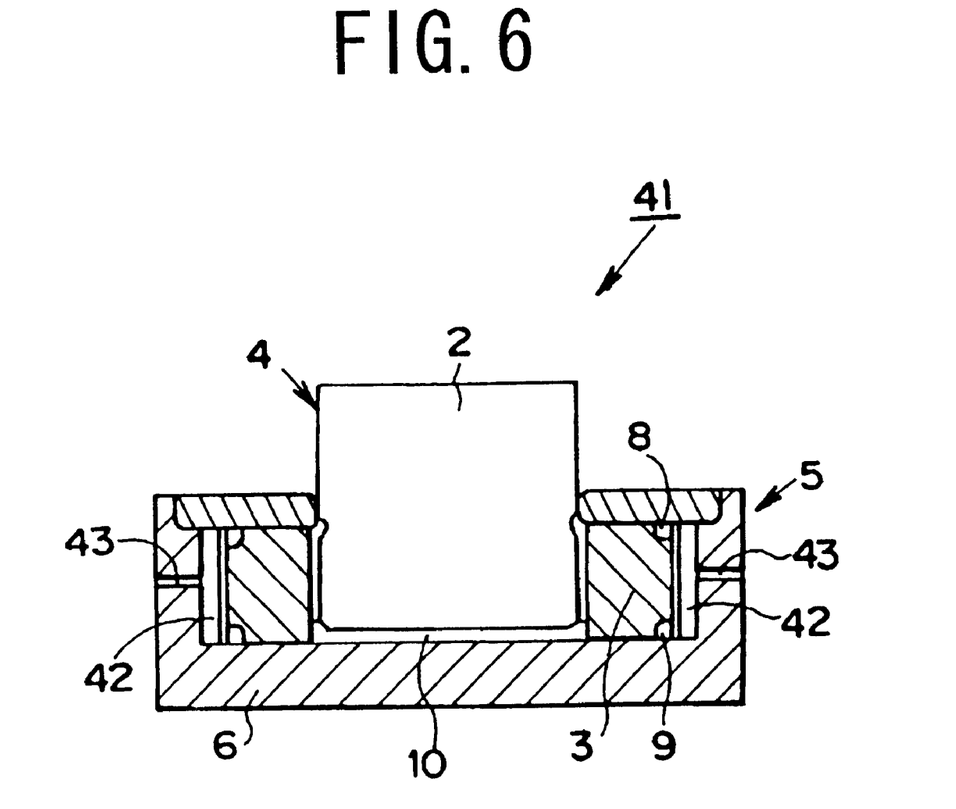
FIG. 6 is a sectional view showing another embodiment of a ring-like hydraulic dynamic pressure bearing portion according to the invention.

FIG. 6 shows still another embodiment of a ring-like hydraulic dynamic pressure bearing. In a ring-like hydraulic dynamic pressure bearing 41, vertical grooves 42 are provided at locations of the inner peripheral face 6Aa of the recessed portion 6A of the bearing portion main body 6 and the vertical grooves 42 are made to communicate with the atmosphere via through holes 43 perforated in the peripheral wall portion of the bearing portion main body 6 to thereby maintain the ring-like spaces 8 and 9 at atmospheric pressure.

According to the constitution, the ring-like member 61 or 320 is dispensed with, and accordingly a number of parts can be reduced and a reduction in the assembly cost can be achieved.

Figure 7:
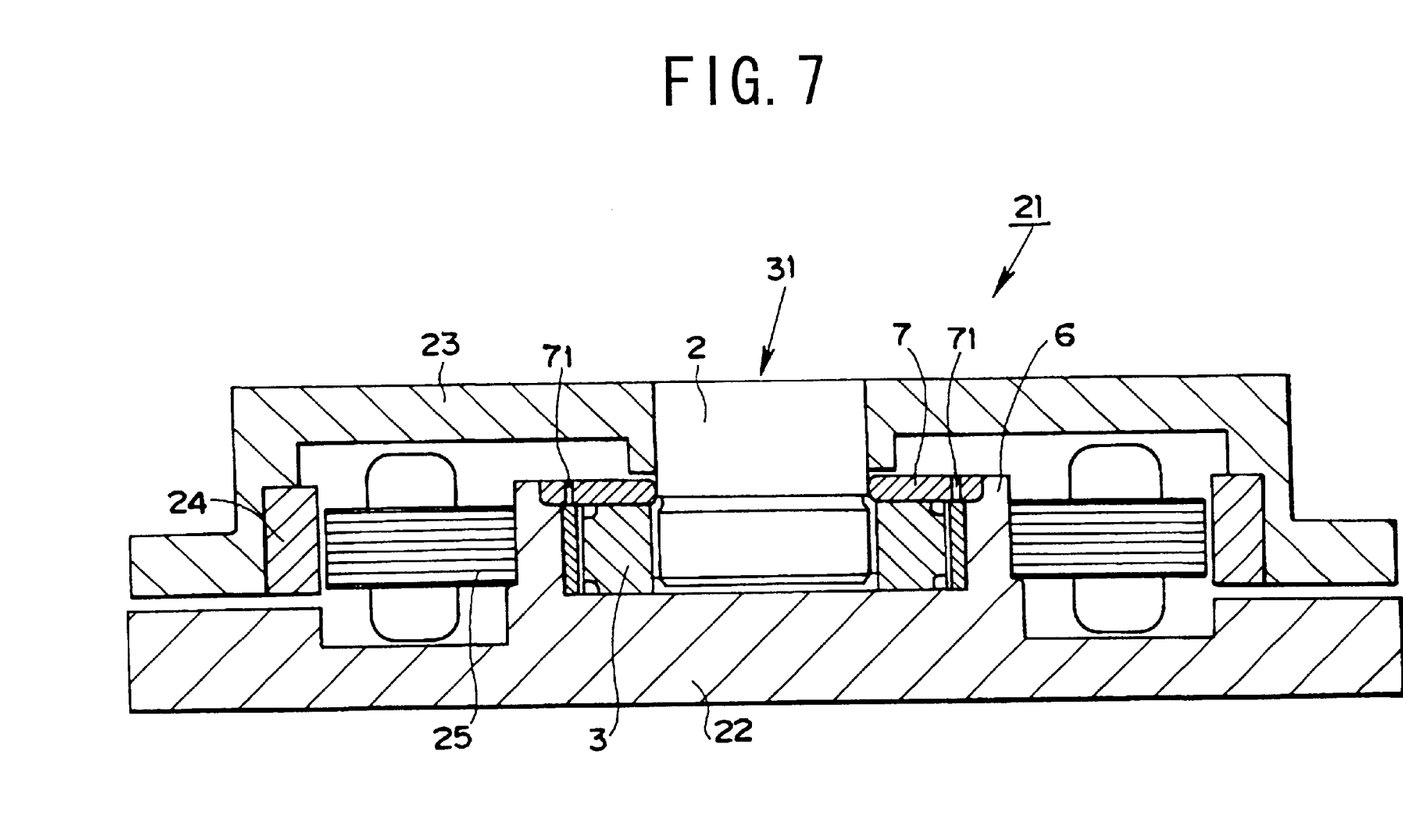
FIG. 7 is a sectional view showing an example of an embodiment of a spindle motor constituted by using the ring-like hydraulic dynamic pressure bearing shown by FIG. 4.

FIG. 7 is a sectional view showing an example of an embodiment of a spindle motor constituted by using the. ring-like hydraulic dynamic pressure bearing 31 shown by FIG. 4. According to a spindle motor 21, a base 22 is integrally assembled with the ring-like hydraulic dynamic pressure bearing 31 shown in FIG. 4. That is, the bearing portion main body 6 of the ring-like hydraulic dynamic pressure bearing 31 is formed integrally with the base 22. A hub 23 is fixed to the shaft main body 2 of the ring-like hydraulic dynamic pressure bearing 31 and a rotor magnet 24 attached to the hub 23 and a stator coil 25 attached to the base 22 are opposed to each other with a very small clearance.

The spindle motor 21 is constituted as described above and accordingly, when current is made to flow in the stator coil 25, the hub 23 rotatably supported by the ring-like dynamic bearing 31 can be rotated. In this case, since the ring-like hydraulic dynamic pressure bearing 31 is constituted as described above, the dynamic pressure function is excellent and the axial rigidity is excellent and accordingly, the hub 23 can stably be rotated. Therefore, when a magnetic disk is attached to the hub 23 by publicly-known pertinent means, the magnetic disk can be rotated extremely stably and magnetic recording and reading can be carried out at an extremely high density.

Further, the ring-like hydraulic dynamic pressure bearings 1 and 41 shown in FIG. 1 and FIG. 6 can be used in place of the ring-like hydraulic dynamic pressure bearing 31 for the spindle motor 21 shown in FIG. 7 and a similar effect can be achieved.

According to the invention, in the ring-like hydraulic dynamic pressure bearing, there are provided ring-like spaces for storing the lubricant at the portions of the axial dynamic pressure bearing portions and the radial dynamic pressure bearing portion contiguous to each other, and further, the pressure of these ring-like spaces are maintained at atmospheric pressure and accordingly, mutual interference between the two dynamic pressure bearing portions can effectively be prevented, air bubbles are avoided to produce in the lubricant in the contiguous regions, axial rigidity can be promoted more effectively than in the conventional bearing and a hydraulic dynamic pressure bearing having good function can be provided.

Further, since the very small spaces formed by the shaft main body and the bearing portion are communicated with the atmosphere by using circulation paths, the dynamic pressure properties of the dynamic pressure generating portions communicating with the very small spaces can significantly be improved.

Further, by constituting a spindle motor using this hydraulic dynamic pressure bearing, stable rotation is achieved and a motor having better function can be realized.

What is claimed is:

1. A hydraulic dynamic pressure bearing comprising: a shaft portion constituted by a ring fixed to an end portion of a shaft main body and a bearing portion supporting the shaft portion via the ring and formed with a radial dynamic pressure bearing portion and axial dynamic pressure bearing portions contiguously to each other between the ring and the bearing portion; wherein ring-like spaces for storing a lubricant for generating dynamic pressure are provided along portions of the radial dynamic pressure bearing portion and the axial dynamic pressure bearing portions contiguous to each other, the ring-like spaces being maintained at atmospheric pressure.

2. The hydraulic dynamic pressure bearing according to claim 1; wherein the ring-like spaces are provided by stepped portions formed at corner portions of the ring.

3. The hydraulic dynamic pressure bearing according to claim 1; wherein the ring has axial dynamic pressure generating grooves for forming the axial dynamic pressure portions and radial dynamic pressure generating grooves for forming the radial dynamic pressure portion.

4. The hydraulic dynamic pressure bearing according to claim 1; wherein the ring-like spaces are provided by stepped portions formed at corner portions of the ring, and further comprising ring-like recessed portions formed in the bearing portion in correspondence with the stepped portions.

5. The hydraulic dynamic pressure bearing according to claim 1; wherein the bearing portion is provided with a chamber communicating with the atmosphere, the chamber communicating with the ring-like spaces via constricted passages.

6. The hydraulic dynamic pressure bearing according to claim 1; wherein a clearance is provided between an end face of the shaft main body and the bearing portion opposed thereto, and paths for communicating the clearance with the atmosphere are formed at the inner peripheral face of the ring to thereby enable circulation of a lubricant through the clearance and the paths.

7. A spindle motor constituted by using the hydraulic dynamic pressure bearing according to any one of claims 1 through 6.

8. A spindle motor used for driving to rotate a storage medium constituted by using the hydraulic dynamic pressure bearing according to any one of claims 1 through 6.

* * * * *